United States Patent [19]
Goelz et al.

[11] 3,755,320
[45] Aug. 28, 1973

[54] CONTINUOUS MANUFACTURE OF DICHLOROISOCYANURIC ACID

[75] Inventors: Horst Goelz, Schwetzingen; Hubert Suter, Ludwigshafen, both of Germany

[73] Assignee: Badische Anilen & Soda-Fabrik Aktiengesellschaft, Ludwigshafen/Rhine, Germany

[22] Filed: Nov. 4, 1970

[21] Appl. No.: 86,987

[52] U.S. Cl............................................. 260/248 C
[51] Int. Cl............................................. C07d 55/40
[58] Field of Search ................................. 260/248 C

[56] References Cited
UNITED STATES PATENTS

| | | | |
|---|---|---|---|
| 3,147,254 | 9/1964 | Paterson | 260/248 |
| 3,289,312 | 12/1966 | Wenzke et al. | 260/248 |
| 3,336,228 | 8/1967 | Fuchs et al. | 260/248 |
| 3,415,823 | 12/1968 | Moore et al. | 260/248 |

*Primary Examiner*—John M. Ford
*Attorney*—Johnston, Root et al.

[57] ABSTRACT

Continuous manufacture of dichloroisocyanuric acid by reacting cyanuric acid with chlorine aqueous alkaline solution at a specific ratio of the reactor dimensions, under specific conditions of temperature and flow rate of the reaction mixture and at a specific molar ratio of the starting materials.

The compound produced by the process of the invention is a valuable intermediate in the manufacture of bleaches, oxidizing agents, detergents and disinfectants.

6 Claims, No Drawings

CONTINUOUS MANUFACTURE OF DICHLOROISOCYANURIC ACID

This invention relates to a process for the continuous manufacture of dichloroisocyanuric acid by reacting cyanuric acid with chlorine in aqueous alkaline solution at a specific ratio of the reactor demensions, under specific conditions of temperature and flow rate of the reaction mixture and at a specific molar ratio of the starting materials.

A by-product formed during the chlorination of cyanuric acid in aqueous alkaline solution is nitrogen trichloride, which readily decomposes and is toxic. Since the reason for its formation is frequently considered to be the existence of a certain pH during chlorination causing the triazine ring of the chlorinated isocyanuric acid molecule to dissociate by oxidation, the method of forming a slurry of the cyanuric acid in water and then chlorinating it in an acid medium (German Pat. No. 1,072,625) or an alkaline medium (U.S. Pat. Nos. 2,970,998; 2,964,525; and 3,241,912) has been adopted. German Pat. No. 1,235,932 describes a single-stage or multi-stage continuous chlorinating process in which temperature control and feed-rate control are effected by measuring the pH or redox potential, these measures being intended to ensure safe operation at optimum reaction parameters.

U.S. Pat. No. 3,415,823 proposes a method in which vigorous mixing of the starting materials is effected by perforated baffle plates in the vertical reaction tube and the use of carbon dioxide. This process makes use of temperatures of from 4° to 85°C and pH values ranging from 8 to 11 at the commencement of the reaction to 2.5 to 4.5 at the end of the reaction. The molar ratio of alkali metal hydroxide or carbonate to cyanuric acid is 2:1.

Although all of these processes reduce the risk of nitrogen trioxide formation, they are unsatisfactory as regards yield and space-time yield.

It is an object of the invention to provide a new process for the manufacture of dichloroisocyanuric acid in better yield, space-time yield and purity and in a more economical manner.

This and other objects are achieved and dichloroisocyanuric acid is advantageously obtained by continuous reaction of cyanuric acid with chlorine in aqueous alkaline solution when the reaction is carried out in a reactor in which the ratio of length to inside diameter is from 50 to 200 : 1; the initial reaction temperature is between 20° and 100°C and the final temperature is between −10° and +50°C; the rate of flow of the reaction mixture is from 0.4 to 4.5 m/sec.; and the molar ratio of the starting materials alkali metal hydroxide to cyanuric acid is from 2 to 2.4 : 1 and that of the starting materials chlorine to cyanuric acid is from 2 to 100 : 1.

The reaction may be represented by the following equation illustrating the use of sodium hydroxide:

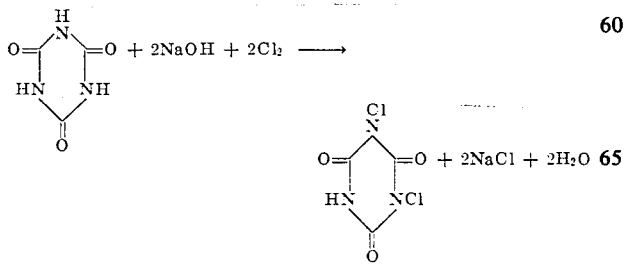

The process of the invention is based on the observation that optimum results are not achieved by adjusting the pH value, the temperature or any other parameter alone but by selecting a combination of specific conditions, of which the most important are the dimensions of the reactor and the rate of flow of the mixture in the reaction chamber. Compared with prior art processes, the process of the invention produces dichloroisocyanuric acid in a higher yield, space-time yield and purity and in a more economical manner. For example, space-time yields of about 3.6 kg/l hr may be achieved as compared with 0.36 or 0.83 kg/l hr in known processes. Measuring and control instruments are unnecessary and the formation of nitrogen trichloride is largely prevented, thus increasing the safety in operation.

Cyanuric acid is preferably reacted in a 3.0 to 12.0 percent w/w aqueous alkaline solution. Suitable alkalis are alkali metal hydroxides, preferably sodium hydroxide. The reaction is carried out at a molar ratio of alkali metal hydroxide to cyanuric acid of from 2 to 2.4 : 1 and a molar ratio of chlorine to cyanuric acid of from 2 to 100 : 1, preferably from 2.4 to 20 : 1. The temperatures of which the reaction is carried out are, at the commencement of the reaction, between 20° and 100°C, preferably between 40° and 70°C, and, at the end of the reaction, between −10° and +50°C, preferably between +5° and +20°C. The reaction may be carried out at atmospheric pressure, or, preferably, at superatmospheric pressure, advantageously at a pressure of from 0.3 to 1.5 atmospheres.

Important features of the invention are the dimensions of the reactor and the rate of flow of the mixture in the reaction chamber. The reactors used in the present process are preferably vertical reaction tubes having a displacement-type cooler in the lower third and a constant diameter over their entire length or a diameter tapering in the direction of flow, the ratio of length to inside diameter being from 50 to 200 : 1, preferably from 80 to 120 : 1, and the rate of flow being from 0.4 to 4.5 m/sec., preferably from 0.8 to 2.5 m/sec. Under the said conditions the pH of the reaction mixture is usually between 11.5 and 13.0 at the commencement of the reaction and between 1.6 and 2.3 upon completion of the reaction.

The reaction may be carried out as follows: In a storage vessel an aqueous alkaline cyanuric acid solution of the stated concentration is maintained at the stated initial temperature. A metering pump withdraws the solution continuously from the tank and passes it through a cooler or preheater to a nozzle. The admission temperature and the initial pH are maintained at the values stated above. Inside the nozzle or at its outlet the solution is vigorously mixed with chlorine.

A two-component mixing nozzle in which mixing takes place in the nozzle chamber, or an atomizer nozzle in which mixing takes place at the nozzle outlet may be used. The chlorine is used either as a gas or as a liquid. The jet reactor may be used in conjunction with a second nozzle and/or with a vertically disposed tube, preferably a double-walled tube. If, in the case of a high excess of chlorine, the heat of reaction is removed by the gas itself, the vertical tube does not require a cooling jacket. The final temperature at the tube outlet is held at between −10° and +50°C, preferably between +5° and +20°C.

The chlorine gas forms bubbles within the tube, the length of the bubbles being from 0.2 to 10 times the inside diameter of the tube. If, on leaving the nozzle, the alkali metal cyanurate solution is not fully converted to dichloroisocyanuric acid, the gas bubbles cause the precipitated dichloroisocyanuric acid to ascend on the air-lift pump principle, whilst that portion of the solution which does not contain any product flows down the inside of the tube walls as a thin film with the result that further intensive chlorine exchange takes place. The said combination of nozzle and reaction tube constitutes a preferred embodiment of the process of the invention with regard to achieving optimum yields.

The mixture leaves the tube at the pH stated above and passes to a tank whose gas outlet is connected to the chlorine feed via a compressor such that unconverted chlorine may be recycled to the reaction. The dichloroisocyanuric acid is removed from the mixture in known manner, for example by filtration using a continuous rotary pressure filter.

The compound produced by the process of the invention is a valuable intermediate in the manufacture of bleaches, oxidizing agents, detergents and disinfectants. For uses thereof, reference is made to the patent specifications mentioned above.

In the following Examples the parts are by weight unless otherwise stated. Parts by weight bear the same relationship to parts by volume as the kilogram to the liter.

EXAMPLE 1

An atomizer nozzle is used in conjunction with a vertical reaction tube having a cooling jacket. The ratio of length to inside diameter of the reaction tube is 100 : 1.

300 parts of cyanuric withdarwn are added to 4,000 parts of water in a storage vessel. To the resulting slurry there is added, at room temperature, 223 parts of sodium hydroxide, the temperature rising to 36°C. The mixture is analysed titrimetrically and found to have a ratio of cyanuric acid to alkali metal hydroxide of 1 : 2.38 and a cyanuric acid concentration of 0.07 parts per part by volume. The solution is withdrawn from the storage vessel and passed through the nozzle into the reaction tube. At a pressure of 0.8 atmospheres, 1,800 parts of the solution is reacted per hour in the reaction tube with 213 parts per hour of chlorine. The initial pH is 12.8 and the pH of the mixture at the tube outlet is 1.9. The temperature of the mixture upon admission to the tube is +32°C, and on leaving the tube +15°C. The rate of flow of the mixture in the tube is 1.6 m/sec. The reaction mixture obtained is freed from excess chlorine in a degasifying tank. The mixture is then filtered and dried in vacuo. The hourly yield is 143 parts of dichloroisocyanuric acid (equivalent to a yield of 73.9 percent of theory and a space-time yield of 2.25 kg/l hr) and 38 parts of monochloroisocyanuric acid.

EXAMPLE 2

300 parts of cyanuric acid is slurried with 4,000 parts of potable water and the mixture is brought almost to the boil. 223 parts of sodium hydroxide is then added. The alkali metal cyanurate solution thus prepared is reacted with 403 parts of chlorine in the manner described in Example 1. At a throughput of 1,800 parts of alkali cyanurate solution per hour the yield is 190 parts of dichloroisocyanuric acid per hour. This is equivalent to a yield of 98.2 percent of theory, based on the cyanuric acid introduced, and a space-time yield of 2.97 kg/l hr.

EXAMPLE 3

470 parts of cyanuric acid is slurried at room temperature with 4,000 parts of potable water and 292.5 parts of sodium hydroxide is added. The molar ratio of cyanuric acid to alkali metal hydroxide is 1 : 2.05 and the concentration of cyanuric acid is 0.115 parts per part by volume. 1,800 parts per hour of this solution and reacted in the reactor with 251 parts per hour of chlorine gas in the manner described in Example 1. The excess chlorine gas is recycled. The yield is 315 parts per hour of dichloroisocyanuric acid, equivalent to a yield of 99.2 percent of theory based on the amount of cyanuric acid introduced. The chlorine yield is about 97 percent of theory taking into account the chlorine recycled. The space-time yield of the product is 4.2 kg/l hr.

We claim:

1. A process for the continuous manufacture of dichloroisocyanuric acid by reaction of cyanuric acid with chlorine in aqueous alkaline solution wherein the reaction is carried out in a reactor in which the ratio of length to inside diameter is from 50 to 200 : 1; the initial reaction temperature is between 20° and 100°C and the final temperature between −10° and +50°C; the rate of flow of the reaction mixture is from 0.4 to 4.5 m/sec.; and the molar ratio of alkali metal hydroxide to cyanuric acid is from 2 to 2.4 : 1 and that of chlorine to cyanuric acid is from 2.4 to 20 : 1.

2. A process as claimed in claim 1 wherein the initial temperature of the reaction is from 40° to 70°C.

3. A process as claimed in claim 1 wherein the final temperature of the reaction is from 5° and 20°C.

4. A process as claimed in claim 1 wherein the reaction is carried out at a pressure of from 0.3 to 1.5 atmospheres.

5. A process as claimed in claim 1 wherein the reaction is carried out in a reactor in which the ratio of length to inside diameter is from 80 to 120 : 1.

6. A process as claimed in claim 1 wherein the reaction is carried out at a rate of flow of from 0.8 to 2.5 m/sec.

* * * * *

UNITED STATES PATENT OFFICE
CERTIFICATE OF CORRECTION

Patent No. 3,755,320      Dated August 28, 1973

Inventor(s) Horst Goelz & Hubert Suter

It is certified that error appears in the above-identified patent and that said Letters Patent are hereby corrected as shown below:

First page, left-hand column, eleventh line, insert
-- [30] Foreign Application Priority Data
    November 8, 1969   Germany . . . . P 19 56 238.0 --.

Signed and sealed this 29th day of October 1974.

(SEAL)
Attest:

McCOY M. GIBSON JR.
Attesting Officer

C. MARSHALL DANN
Commissioner of Patents